F. L. WARDEN.
TRACTOR ATTACHMENT.
APPLICATION FILED APR. 30, 1919.
1,378,743. Patented May 17, 1921.
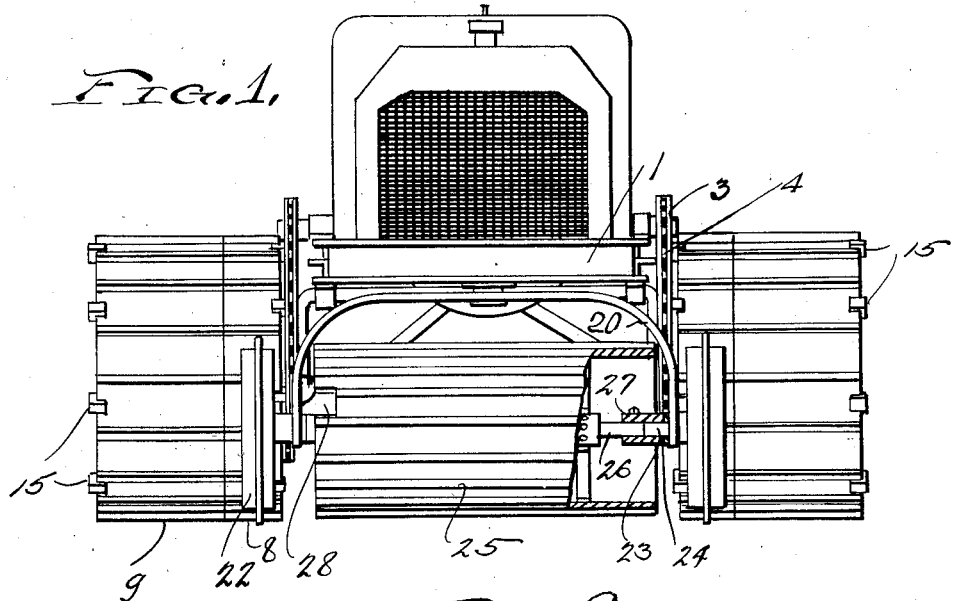
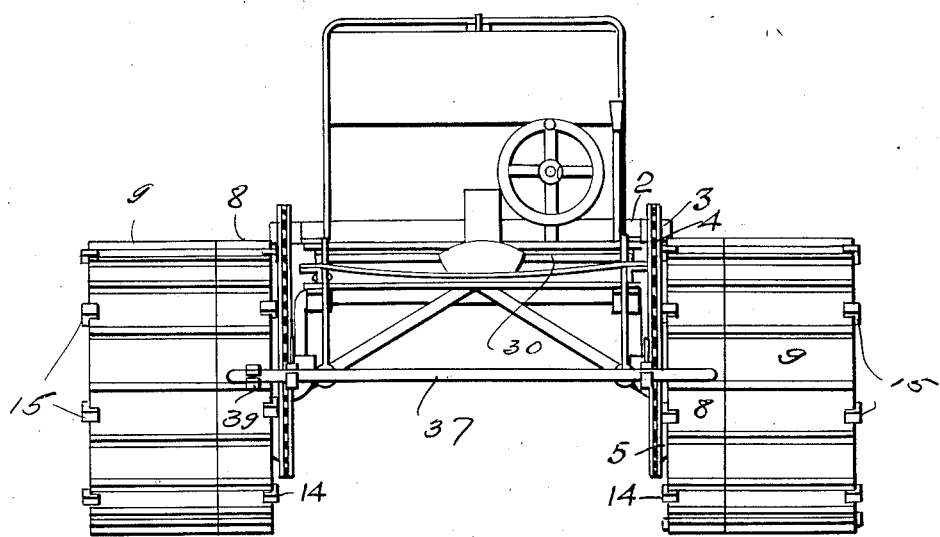
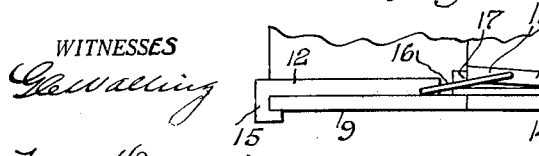
WITNESSES
INVENTOR.
Frank L. Warden
BY
ATTORNEY.

UNITED STATES PATENT OFFICE.

FRANK L. WARDEN, OF DEWAR, OKLAHOMA.

TRACTOR ATTACHMENT.

1,378,743. Specification of Letters Patent. Patented May 17, 1921.

Application filed April 30, 1919. Serial No. 293,684.

*To all whom it may concern:*

Be it known that I, FRANK L. WARDEN, a citizen of the United States, residing at Dewar, in the county of Okmulgee and State of Oklahoma, have invented certain new and useful Improvements in a Tractor Attachment, of which the following is a specification.

This invention relates to new and useful improvements in tractors and more particularly to an improved construction therefor, the primary object being to provide suitable attachments for the ordinary tractor whereby it will be more readily adapted for improving the soil over which it travels.

Another object of the invention is to provide an apparatus of this character which will be readily adapted for plowing the land and rolling the surface before planting and which will automatically maintain a check row planter in position and which will also be adapted for cultivating growing corn.

A further object of the invention is to provide a device which will accomplish the above objects in an efficient and workmanlike manner and which will require only one motor thereby making a material saving in the cost of planting and cultivating the land.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a front end elevation of the tractor partly broken away to show the construction.

Fig. 2 is a rear end elevation thereof.

Fig. 3 is a detail section of a portion of the invention.

Referring to the drawings, wherein is illustrated the preferred form of my invention, in which like numerals of reference indicate like or corresponding parts throughout the several views, the tractor frame 1 is of ordinary construction and is adapted to support the engine of the usual type which drives the counter shaft 2, the latter having sprockets 3 over which chains 4 are trained whereby the sprockets 5 on the rear axle may be driven. The rear axle has its ends provided with the usual tractor wheels 8 which, while usually relatively wide, are not sufficiently wide to prevent deep tracks being formed in the soil when the tractor is in operation. To prevent this, and also to facilitate the pulverizing of the soil while the tractor is in operation, I provide removable auxiliary rims 9 for the wheels 8. These rims are of the same diameter as the wheel rim and are considerably wider and are adapted to be attached to the outer marginal edges of the wheel rims. As shown in Fig. 3, the auxiliary rim engages the edge of the wheel rim and the two rims are fastened together by a securing device 11 each of which consists of a pair of clamps 12 and 13. The clamp 13 fitting around the inner edge of the wheel rim while the clamp 12 fits around the outer edge of the auxiliary rim, the hooks 14 and 15 being provided for this purpose. The meeting ends of the members 12 and 13 are disposed in relatively close proximity and the end of the member 12 carries a link 16 while the end of the member 13 is provided with a lug 17. The free end of the link 16 is connected to a latch 18 approximately intermediate the ends of the latch and one end of the latch is adapted to engage the lug 17 as shown in Fig. 3 so that when the latch 18 is moved into approximately parallel relation with the member 13, a pull will be exerted on the link 16 whereby the two members 12 and 13 will be drawn toward each other for causing the hooks 14 and 15 to tightly engage the rim to maintain them in rigid position, and firmly fastened together. Any number of these fastening devices may be employed on each wheel rim as shown in Fig. 1. With this arrangement it is possible to have the wheel rims of relatively great width and the auxiliary rims together with the wheel rim are provided with the usual cleats and the relatively great width of the structure thus provided prevents deep tracks being formed in the soil and also adds considerable weight to the wheels whereby the soil is thoroughly pulverized and leveled. The front of the tractor is supported by the front support 20. The front wheels 22 are preferably journaled on studs or stub shafts 23 which extend inwardly of the bearings 24 and terminate at points slightly spaced therefrom as shown in detail in Fig. 1. The supplemental roller 25 is provided at the front of the tractor and includes the shaft 26, the ends of which are in engagement with the ends of the stub shafts 23. Sleeves 27 embrace the meeting ends of the shaft so that they are held in longitudinal alinement and so that the supplemental roller 25 may be operated at the front of the tractor. Notches 28 are provided in the ends of the rim of the roller so that the stub shafts may pass therethrough when being mounted in position or removed from the tractor. The roller extends from one side of the tractor to the other and thereby provides a soil engaging roller which travels over the surface not engaged by the rear wheels or auxiliary rims. It will be readily seen that a relatively wide track is covered by this arrangement when the tractor is in operation and all of the soil over which the tractor passes will be pulverized and leveled.

The foregoing description and accompanying drawings have reference to what might be considered to be the approved or preferred form of my invention. I desire it to be understood that I may make such changes in the construction, combination and arrangement of parts, materials, dimensions, et cetera as may prove expedient and fall within the scope of the appended claims.

Having thus fully described my invention what I claim as new and desire to secure by Letters Patent, is:—

1. The combination with a tractor having a pair of rear wheels and a pair of front wheels; of land roller elements, and means for detachably mounting said land roller elements on said rear wheels and between said front wheels.

2. The combination with a tractor having a pair of rear wheels and a pair of front wheels each directly in front of a respective rear wheel; of a pair of land roller elements at the outside of the respective rear wheels, a third land roller element substantially filling the space between said front wheels, and means to detachably secure said land roller elements in position whereby continuous land rolling may be effected from outside to outside of the pair of land roller elements.

3. The combination with a tractor having a pair of front wheels each provided with an inwardly projecting stub axle, said shafts being in alinement; of a land roller having a central axle, cuffs slidably mounted on the ends of the land roller axle and movable onto and off of the stub shafts selectively whereby to support the land roller between said front wheels, and means to lock the cuffs in adjusted position.

In testimony whereof I affix my signature in presence of two witnesses.

FRANK L. WARDEN.

Witnesses:
  Mrs. Nora Beal,
  L. B. Norton.